United States Patent [19]

Uptegraff, Jr. et al.

[11] 4,005,341

[45] Jan. 25, 1977

[54] CASING CONSTRUCTION FOR POLE TYPE DIELECTRIC CONTAINING TRANSFORMER

[75] Inventors: Roy E. Uptegraff, Jr., Scottdale; Charles C. Dixon, Connellsville; Ravindra N. Rahangdale, Mount Pleasant, all of Pa.

[73] Assignee: R. E. Uptegraff Manufacturing Company, Scottdale, Pa.

[22] Filed: Dec. 17, 1975

[21] Appl. No.: 641,387

[52] U.S. Cl. ................................ 317/15; 137/541; 174/11 R; 174/17 VA; 220/85 TC; 220/246; 220/367; 336/90

[51] Int. Cl.[2] .................... H01F 27/02; H02H 7/04

[58] Field of Search ................ 317/14 G, 14 H, 15; 174/17 VA, 11 R; 200/150 H; 137/541, 542, 543; 220/203, 206, 243, 246, 249, 251, 85 TC, 367; 336/90, 92, 94, 55, 57, 58, 105, 65, 67

[56] References Cited

UNITED STATES PATENTS

| | | | |
|---|---|---|---|
| 1,220,296 | 3/1917 | Vanderford | 220/243 X |
| 2,616,585 | 11/1952 | Condit et al. | 220/246 |
| 2,619,316 | 11/1952 | Wilson | 137/541 |
| 3,084,827 | 4/1963 | Dyer | 220/251 |
| 3,719,200 | 3/1973 | Draper et al. | 137/541 |

*Primary Examiner*—Thomas J. Kozma
*Attorney, Agent, or Firm*—Parmelee, Miller, Welsh & Kratz

[57] ABSTRACT

A transformer is provided that utilizes a substantially fully integral, generally outwardly convex casing or tank for enclosing an electrical transformer in a dielectric environment. The casing has fully integral side and top and bottom end walls, and has an open portion in its top end wall of sufficient size to serve both as a positive low to high pressure release and a maintenance hand hole. An easily inserted and removed cover assembly employs an operating stem, a domed cover member, a clamping member, a nut carrying bracket member and a spring that may be adjusted to a desired pressure relief setting by rotating the stem in one direction. Rotation of the stem in an opposite direction releases its clamping setting and loosens the parts of the cover assembly in such a manner as to permit it to be easily and quickly removed from the open portion by tilting it with respect to and out of the open portion.

17 Claims, 8 Drawing Figures

CASING CONSTRUCTION FOR POLE TYPE DIELECTRIC CONTAINING TRANSFORMER

BACKGROUND OF THE INVENTION

1. Field of the Invention

This invention pertains to a pole mounting type of electrical distribution transformer such as used for converting a 13,200 volt A.C. input to a 240/120 volt, single phase A.C. output for domestic and other usage that will permit hand hole entrance for maintenance and repair work and also provide total safety protection when used with a suitable current limiting fuse from the standpoint of avoiding blow-out of the top end wall under a build-up of high, fault-produced, internal fluid pressure. A phase of the invention deals with an improved transformer casing that has a pre-shaped wall construction based on its being subjected to relatively high positive internal fluid pressure, and that will have a combined hand hole cover and a simple and highly effective pressure relief means capable of efficient operation between lower cut-off to materially higher internal fluid pressures.

2. Description of the Prior Art

In recent years there has been a growing problem in the construction of overhead pole type distribution transformers from the standpoint of the blowing-off of upper cover end walls under internal fluid pressures developed by over-pressure phenomena, such as caused by electric arcing and other electrical faulting. Such transformers are mounted near the top of utility poles in residential areas, thus they tend to menace both persons and properties, since oil or other content may be ejected to fall as a hot and possibly fiery rain on anything or anyone in the immediate vicinity. Although so-called bleeder or light duty valve means have been mounted on the side of transformer tanks or housings for normal relatively low pressure venting, such means has been found totally unsatisfactory from the standpoint of a sudden and particularly high fluid pressure generation within the transformer such as may occur due to a fault of electrical equipment therein.

A conventional end wall cover which is retained in position over the upper edges of the side wall of a tank or housing by a take-up clamping chime ring similar to those used on dry bulk storage drums, represents a type that is most likely to be dislodged with considerable force under such conditions. Such covers for pole type transformers are made removable, since there are no other openings to permit access to the inside of the housing for modifying internal connections, operating internal tap changing switches and, in general, for easy maintenance.

Another type of end wall cover is removably mounted over the upper edge of the side wall of a transformer housing by means of a centrally projecting lug bolt whose inner end is threaded into an integrally secured cross piece within the housing and which serves to draw up the cover to a tightened relation on the circumferential edge of the housing. Both of these constructions entail risk from the standpoint of cover blow-off under high or sudden internal fluid pressure applications, such as occur from a failure to relieve quickly arising pressure that develops rapidly within the casing due to a fault which may result from the formation of an electrical arc under the oil dielectric. Such an arc may be caused by insulation failure or the fusing-apart of wires within or near the transformer windings, such as may occur under adverse operating conditions or as a result of some defect. Cover end wall blowing may be due to a very rapid internal pressure rise that can lift the oil column and slam it against the cover, simultaneously producing a force in the opposite direction against the bottom of the tank or housing and as well as forces against its sides. A second type has a fairly slow rise which gradually builds up in the transformer top and results in a blown cover and/or a deformed tank. The fault may or may not cause vaporization of the oil within the air space above the normal dielectric level therein.

As above indicated, side mounted relief devices have been provided to act as safety valves against normal pressure build-ups, such as due to loading and overloading of transformers. These valves are relatively small and inadequate to effectively relieve rapid build-up of pressure such as may occur as when internal arcing is present. There has been a need for an improved type of transformer tank or housing construction which can be relatively inexpensively produced and which will meet the problem involved in previous constructions, particularly from the standpoint of preventing high pressure dislodgement of the upper end wall and, in general, pressure deformation of a transformer tank or housing and, at the same time, which will permit entry to the inside of the casing for maintenance and repair of the electrical equipment therewithin.

SUMMARY OF THE INVENTION

It has thus been an object of the invention to provide an improved and more efficient enclosure construction for an overhead or pole type of transformer, particularly from the standpoint of providing a safe and sure type of venting or relief of fault-produced internal pressure build-up.

Another object of the invention has been to develop a new and and improved form of casing or housing construction for an overhead type of dielectric containing electrical transformer which will be effective to relieve normal minor operating fluid pressure and which, at the same time, under emergency conditions of high pressure build-up, will provide immediate and effective pressure relief without damaging its casing, blowing its end wall cover, and spewing hot fluid such as oil therefrom.

A further object of the invention has been to provide a transformer casing which may be substantially integral throughout its construction and will thus not require separate grounding connections as between its top end wall and its main cylindrical body, and which will enable a combined maintenance entry to its interior and a safety venting under high pressure build-up.

A further object has been to provide a transformer installation that in combination with a current limiting input fuse will assure a fully effective blow-off protection against fault-generated internal pressure.

A still further object of the invention has been to provide a practical, removable hand hole cover and safety relief construction for utilization with an enclosing upper end wall of an electrical transformer.

These and other objects of the invention will appear to those skilled in the art from the illustrated embodiment and the claims.

BRIEF DESCRIPTION OF THE DRAWINGS

Specifically, FIG. 4 shows a tilted and slightly separated relation of the parts of the cover assembly that may be employed when the assembly is being inserted or removed from within an open entry end portion of the integral end wall;

FIG. 5 is illustrative of an adjusted, fully mounted position of the cover assembly at which its spring means is set to provide a tension closing action that is based on the force at which it is desired to have the cover assembly open to relieve internal fluid pressure;

FIG. 6 is illustrative of a uniform full opening of the cover member assembly, as effected by compressing the spring under force exerted internally of the transformer housing, such as may be occasioned by arcing within its chamber;

Figure 5:
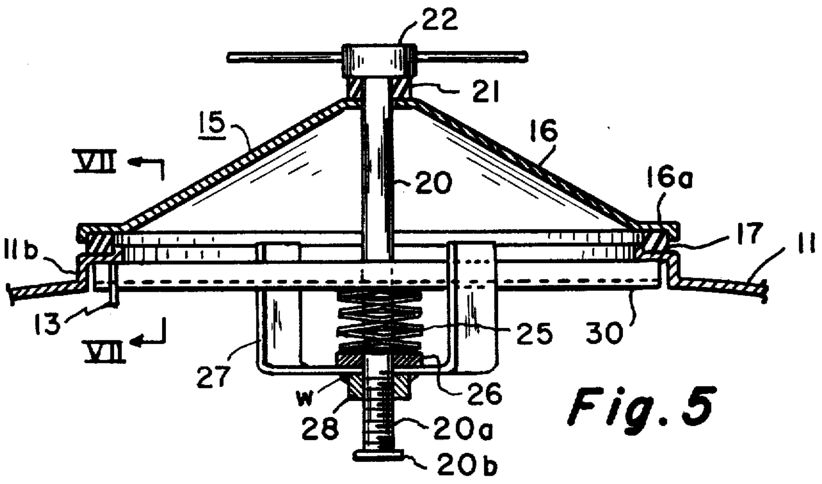
Figure 7:
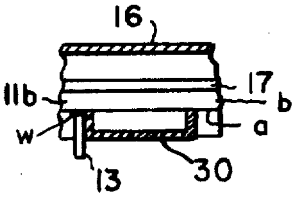

And, FIG. 7 is a fragmental section on the scale of and taken along line VII—VII of FIG. 5.

DESCRIPTION OF THE PREFERRED EMBODIMENT

Figure 1A:
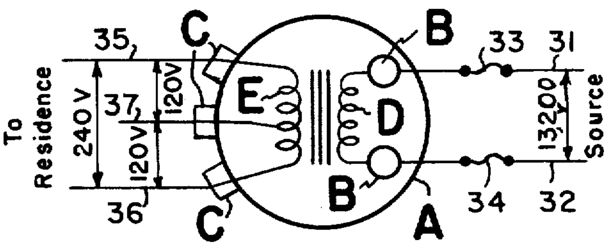
FIG. 1A is a circuit diagram showing the use of at least one current limiting fuse in the transformer input circuit.
Figure 1:
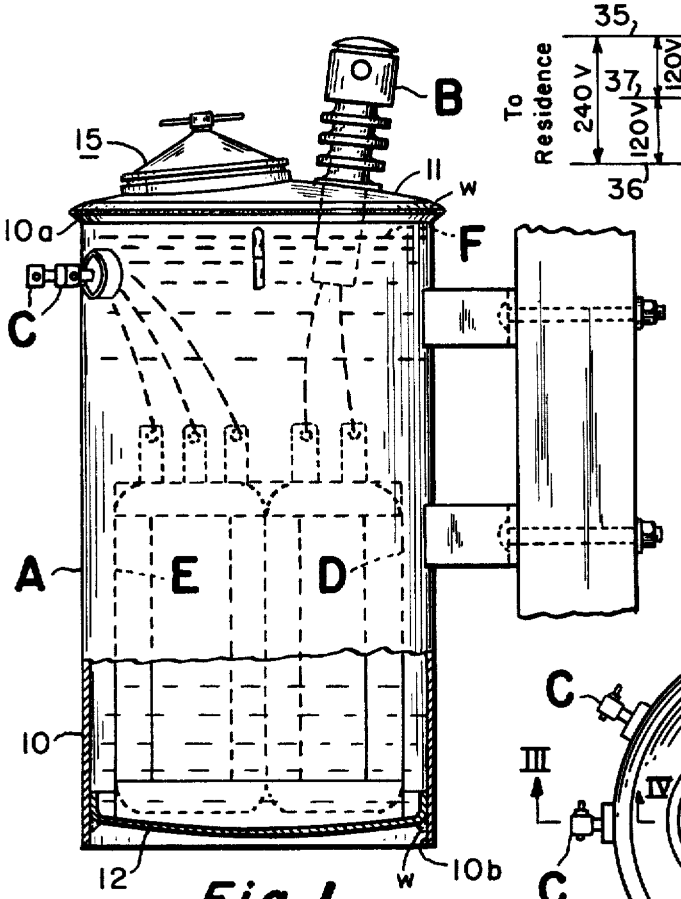
FIG. 1 is a side view in elevation of a transformer devised and constructed in accordance with the invention.
Figure 2:
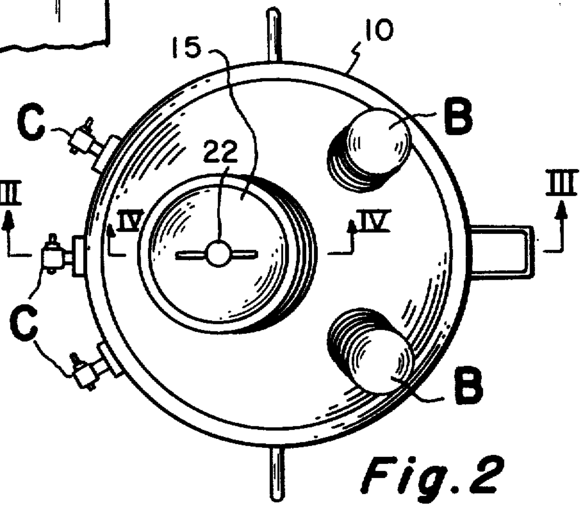
FIG. 2 is a top plan view of the transformer of FIG. 1 and on the same scale as FIG. 1.

Referring particularly to FIGS. 1 and 2 of the drawings, an electrical power transformer unit A of an overhead or pole-mounting type is shown having a pair of high voltage input terminals B, and a group of side-mounted secondary or output terminals C. The unit A is shown provided schematically with a primary transformer winding D and a secondary winding E in a submerged relation within a dielectric liquid such as oil whose level is indicated as F. The hollow casing, housing or tank of the unit A has a cylindrical, upwardly extending, elongated side wall 10, and outwardly convex, integral, top and bottom end walls 11 and 12. It will be noted that end walls 11 and 12 are shown integral with and hermetically sealed with respect to the side wall 10 by continuous weld beads *w* (see FIG. 1). The side wall 10 has an angle-shaped, upper rim flange 10*a* whose inclined, inturned, uppermost portion serves as a receiving face for a complementary-shaped, outwardly sloped, over-fitting, mounting flange or rim 11*a* of the upper end wall 11 (see FIG. 3). Also, the side wall 10 has a circular, downwardly extending flange portion 10*b* of at least the full depth of the convex curvature of the bottom end wall 12. The outward convex shape of the angle-shaped mounting flange 11*a*, as well as the outward convexity of the side wall 10 and the end walls 11 and 12 provide a container construction of generally outwardly convex curvature that is able to withstand internal pressure forces that may otherwise tend to deform and thus weaken the casing or tank. The strength characteristics of the casing can thus be accurately predicted on the basis that fault-produced fluid pressure exerted internally against the wall, will have no deforming effect on its walls.

Figure 3:
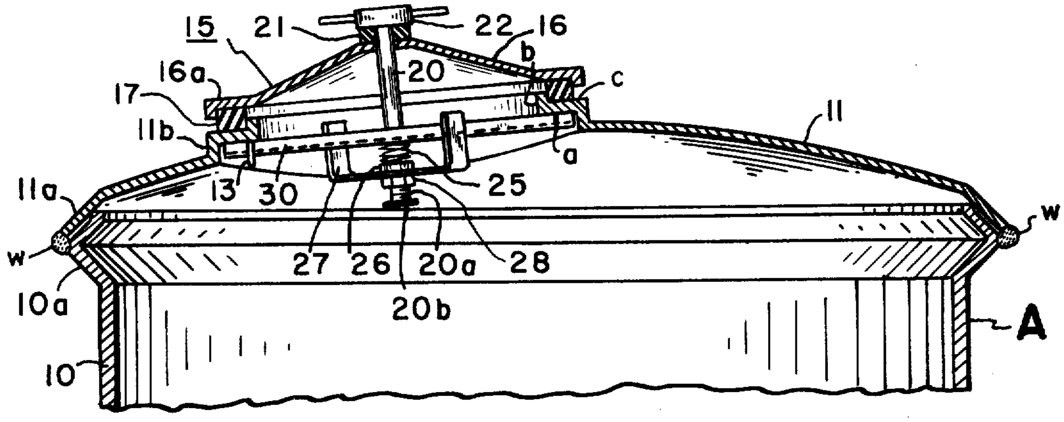
FIG. 3 is an enlarged fragmental side section in elevation taken along line III—III of FIG. 2.

With particular reference to FIGS. 3 to 7, inclusive, the upper end wall 11 of the generally outwardly convexly shaped casing or tank of the unit A has a slightly sidewise-offset, open hole portion therethrough that provides a combined pressure relief and maintenance hand hole as defined by a seating flange 11*b* thereabout. As shown particularly in FIG. 3, the flange 11*b* is of angle-shape and has a horizontally planar underside portion *a* which is adapted to receive and position a cross-extending clamping member 30 (shown on channel-shape) to retain a cover assembly 15 in position with respect thereto. An innermost ring-like rim portion *b* of the flange 11*b* surmounts a horizontally planar upper seating face of ledge portion *c* that is in a direct parallel and opposed relation with respect to the underface *a*. When the cover assembly 15 is in a closed position such as shown in FIG. 3, the ledge portion *c*, in combination with the rim portion *b*, serves to receive and position a ring-like resilient seating gasket 17 of rectangular section thereon.

The assembly 15 has an outwardly convex or dome-shaped cover part or cap 16 that has a central opening therethrough to position and receive an operating stem 20. The cover 16 has a sealing flange portion 16*a* which on its underside is horizontally planar in a complementary manner with respect to the opposed upper face *c* of the flange 11*b*, and which is downwardly surmounted by a rim edge portion to receive and cooperate with the gasket 17. The gasket 17 may be cemented to either the under surface of flange 16*a* or to the upper face *c* of the flange 11*b* in such a manner that the opposed flanges will serve to provide a full closure of the open portion defined by the inwardly extending flange 11*b* of the end wall 11.

Figure 4:
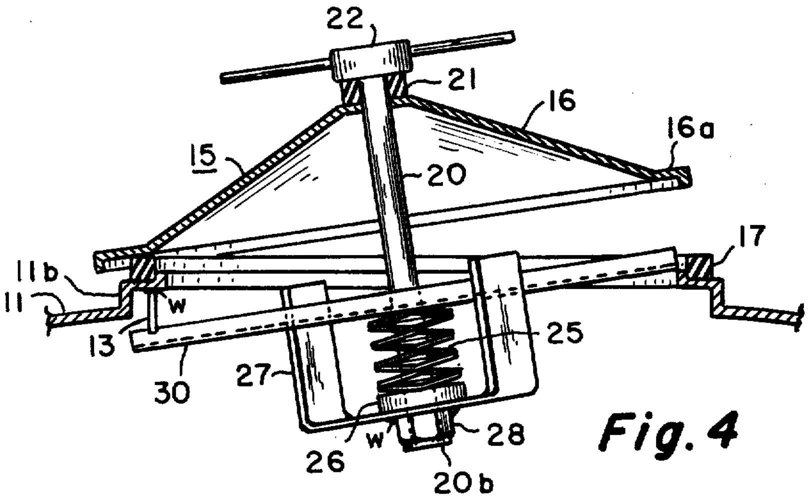
FIGS. 4, 5 and 6 are side sectional details in elevation on a greatly enlarged scale, particularly illustrating the construction and utilization of a combined pressure relief and hand-hole cover of the invention.

The operating stem 20 is carried for rotative movement with respect to the cover 16 by a bearing gasket 21 of a suitable relatively stiff resin material such as Teflon that is secured on the upper side of the cover. A handle portion, such as a cross bar or lever 22, is carried in a secured relation on the upper end of the stem 20 for manually rotating or turning it within and with respect to a nut 28 that is mounted on its lower threaded end portion 20*a*. The lower extent of the threaded portion 20*a* is sufficient to permit the cover assembly 15 to, as shown in FIG. 4, have its parts loosely retained in position with respect to each other for insertion and removal with respect to the open portion defined by the flange 11*b*. An end collar or flange 20*b* serves as a stop for limiting the maximum upward movement of the stem 20 within the nut 28 to thus prevent a separation of the cover assembly, such as may entail a fishing operation within the interior of the transformer tank.

Figure 6:
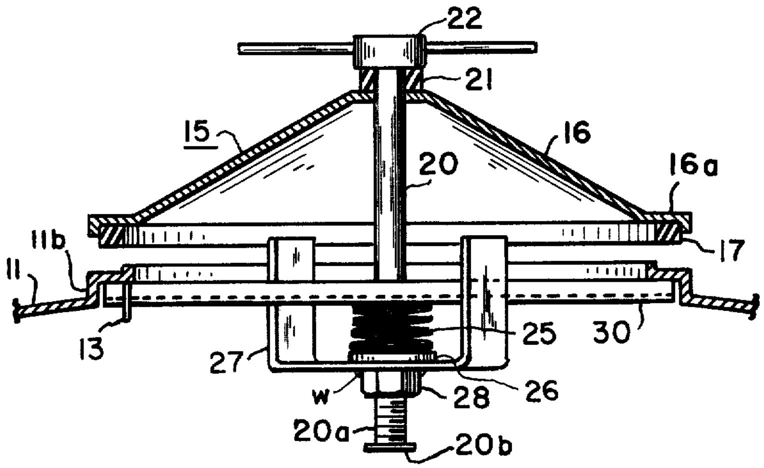

Spring and clamping means is carried on the stem 20 and has a U-shaped bracket 27; the nut 28 is secured to an underside of its horizontal connecting portion, as by weld metal *w*. The bracket 27 has a pair of leg portions which extend upwardly from its central connecting portion to at least the height of the clamping member 30, in order to cooperate with opposite sides of the member 30 and prevent turning of the nut 28 when the stem 20 is being rotatably adjusted. The clamping member 30 which may also be a solid bar rather than a channel-shaped member, as shown particularly in FIGS. 6 and 7, is adapted at one end to abut against a downwardly projecting latching or stop lug or pin 13 that is shown welded to the underside portion *a* of the flange 11*b*, see FIGS. 3 and 7. The pin 13 limits rotation of the member 30 during turning movement of the stem 20 and thus, indirectly prevents rotation of the nut 28 through the agency of the bracket 27 whose legs project upwardly on opposite sides of the member 30.

Spring means 25, shown as a so-called Belleville washer type, may also for example, comprise one or more concentric helical springs. The spring means 25 at its upper end engages the underside of the clamping member 30 and its lower end may either directly engage the underside of the bracket 27 or engage abutment washer 26 that may be provided on the innerside of the connecting portion of the bracket 27. The spring means 25 is thus operatively positioned along the stem 20. When the stem 20 is, for example, rotated clockwise to effect upward rise of the nut 28 and the bracket 27 (see FIG. 6) by turning threaded portion 20*a* within the nut 28, a maximum compression force is exerted on the spring 25 that corresponds to the maximum normal operating pressure force to be permitted in the container or tank before it is released. It may, for example, be approximately 9 or 10 lbs./sq. in. The use of a lower force action eliminates any need for a conventional side-mounted relief valve; and rotating the stem 20 in the opposite direction to remove the cover 16 operates to bleed-off gas under moderate pressures below the operating pressure of the assembly.

The amount of potential tension force to be exerted by the spring means 25 is thus controlled by the upper extent of the threaded portion 20*a*. The operation of the assembly 15 is such that it will not only open at a set lower operating pressure force such as 9 to 10 lbs./sq. in., but will also immediately and effectively have a uniform opening cation under fault-generated high pressures of several hundred lbs./sq. in., to thus immediately relieve such pressure as it starts to build up and during its full period of exertion. This instant relief action prevents a large build-up of the pressure force which would tend to blow-off a cover or distort or damage the walls of the container.

The casing or tank of the unit A may be of any suitable material such as metal coated on the outside with a protective resin, the gasket 17 may be of a resilient resin or rubber-like construction, and the cover assembly 15 may also be of metal. It will be noted that the construction and operation of the cover assembly 15 is such that it will open substantially uniformly to define a fully circular opening to relieve pressure. Due to the operation of the spring means 25 the assembly 15 may be only slightly opened for normal operating low pressure release, but will be fully opened when the pressure is of a type such as generated by a transformer fault.

In the representative circuit diagram of FIG. 1A, a pair of high voltage input leads 31, 32 are shown connected to the primary D of the transformer unit A through at least one current limiting fuse 33. However, for maximized protection from the standpoint of a possible grounding, a second current limiting fuse 34 is shown. These fuses may be mounted outside the unit A. The output from the secondary E of the transformer is shown as consisting of leads 35, 36 and 37, with the lead 37 providing a neutral terminal that is grounded to the transformer casing consisting of side wall 10 and integral end walls 11 and 12.

By way of example, a pole type of transformer of the invention may be provided with a casing or tank designed to withstand about 200 lbs./square inch pressure. A typical transfer rate of efflux of about 60 cu. ft. per second atmospheric will result from an internal (tank) pressure of about 25 lbs./sq. inch gauge. The current limiting fuses 33 and 34 positioned outside the transformer may each have a current cut-off rating of or be set at about two times the current rating of the transformer. At least one such fuuse is important in limiting the period of fault-generated pressure build-up in the transformer to thus assure total blow-out protection. This protection not only applies to the blow-out of oil or dielectric fluid, but also of melted copper windings, paper and other material that may be activated by the transformer fault to seek release from the securely sealed or integral, closing-off side and top and bottom end walls of the transformer enclosure.

The exemplary so-called Belleville washer spring type is generically a tension-exerting stack of conical disc spring elements. A bell-mouthed shaped stacked spring assembly or any other suitable type of axially aligned tension-exerting spring may be employed for the spring means 25.

We claim:

1. In an improved overhead transformer enclosure construction which is adapted to carry a dielectric liquid therein, a hollow elongated casing having sealing-off side and top and bottom end walls and that generally has an outwardly convex curvature, an open hole portion through the top end wall defining a combined pressure relief and maintenance hand hole having a seating flange thereabout, and an easily removable and insertable pressure relief and hand hole cover assembly; said assembly comprising: a cover member of outwardly curved shape provided with a sealing flange thereabout, said sealing flange being adapted to cooperate with said seating flange for closing-off said open hole portion, an operating stem rotatably extending through said cover member and having an outer handle portion and an inner threaded end portion, spring and clamping means positioned on said stem beneath said cover member, said clamping means being adapted to extend across said open hole portion to engage an underside of said seating flange, a nut carried on said threaded end portion and retained by said spring and clamping means in a non-rotating position with respect to and on said stem for moving said spring and clamping means inwardly and outwardly thereon and with respect to said cover member when said stem is rotated by said handle means relative thereto, said spring means being positioned between said nut and said clamping means, said stem being adapted to, in one direction of rotation, apply an increasing cover member closing force to said spring and clamping means and to, in an opposite direction of rotation, release the cover member closing force on said spring and clamping means and permit a tilting in and out insertion and removal of said cover assembly with respect to said open hole portion.

2. In an improved transformer enclosure construction as defined in claim 1, said cover member having means centrally and slidably positioning it on said stem adjacent said handle portion, and said cover assembly being adapted to effect a substantially uniform outward opening movement of said cover member about its said sealing flange when fluid pressure within said casing reaches a predetermined value that exceeds the closing force exerted by said spring and clamping means.

3. In an improved transformer enclosure construction as defined in claim 1, sealing gasket means for cooperative positioning between said sealing and seating flanges.

4. In an improved transformer enclosure construction as defined in claim 1, the bottom end wall of said casing having an outwardly convex shape, and the side wall having a bottom rim portion that extends in a banding relation for substantially the full depth of the convexly offset projection of the bottom end wall.

5. In an improved transformer enclosure construction as defined in claim 4, the top end wall having an outwardly convex shape and a cap-like construction whose outer rim portion is adapted to fit over the side wall, and weld metal hermetically securing the outer rim portion to the side wall.

6. In an improved transformer enclosure construction as defined in claim 1, said top and bottom end walls having outwardly convex shapes to substantially correspond to shapes effected by fluid pressure force exerted within the hollow casing.

7. In an improved transformer enclosure construction as defined in claim 1, said spring and clamping means comprising: a cross-extending clamping member loosely positioned on said stem and having a sufficient extent to, at its opposite ends, rest upon the underside of said seating flange when said clamping member is positioned in a substantially parallel relation with respect thereto, retention means having said nut secured thereon, said retention means being adapted to prevent rotation of said nut on said stem, and spring means positioned on said stem between said nut and said clamping member.

8. In an improved transformer enclosure construction as defined in claim 7, an end flange on the lowermost end of said stem for limiting its maximum upward advancement with respect to said nut in loosening the assembly for insertion and removal from said open hole portion, and the threaded portion of said stem terminating at a predetermined distance from said end flange that represents a desired maximum closing force setting for said spring means.

9. In an improved transformer enclosure construction as defined in claim 7, said clamping member and the underside of said seating flange having means for preventing rotative movement of said clamping member when it is positioned in a substantially planar relation with respect to said seating flange, and said retention means being a U-shaped bracket secured in position on said stem between said nut and said spring means and projecting upwardly to engage opposite sides of said clamping member.

10. In an improved transformer enclosure construction as defined in claim 9, a washer element positioned on said stem within and in abutment between a central connecting portion of said U-shaped bracket and a bottom end of said spring means to position it at its upper end in a cooperating relation with the underside of said clamping member.

11. In an improved transformer enclosure construction as defined in claim 1, an end flange on the lower end of said stem to limit maximum separation of said cover member with respect to said spring and clamping means and prevent disassembly of said cover assembly, and the forward extent of said threaded portion of said stem being sufficient, on a rotational downward advance of said stem within said nut, to apply a desired maximum of cover member closing force on said spring and clamping means that represents positive fluid pressure at which said cover member will open to discharge fluid through said open hole portion.

12. In an improved transformer enclosure construction as defined in claim 1, said seating flange having a pin projection extending downwardly from an underside thereof, and said spring and clamping means comprising: a cross-extending bar-like clamping member adapted to engage said pin and retain said clamping member in a non-rotatable position, a retention bracket member that has a lower connecting portion and a pair of side leg portions that extend upwardly along opposite sides of said clamping member to prevent rotation of said bracket member, and helical-shaped spring means positioned on said stem to extend between said clamping member and said retention bracket member; said nut being secured on the connecting portion of said bracket member to move said clamping member upwardly and downwardly when said stem is rotated.

13. In an improved transformer enclosure construction as defined in claim 12, said retention bracket member being of U-shape, and said clamping member being of channel-shaped section.

14. In an improved transformer enclosure construction as defined in claim 3, said sealing gasket means being a ring gasket carried by said sealing flange as as a part of said cover assembly, and said operating stem having means for preventing a disassembly of said cover assembly when said stem is rotated in the opposite direction to release the cover member closing force on said spring and clamping means.

15. In an improved overhead pole mounting type of electrical distribution transformer construction, a metal casing defining an operating chamber therein and being of generally hollow cylindrical shape, an oil-immersed transformer within said casing having high voltage input electric leads thereto and having low voltage output leads extending therefrom, a current limiting fuse connected within the high voltage input leads and adapted to cut-off electrical current flow to said transformer after a fault occurs, said transformer casing having securely sealed closing-off top and botton end walls of outwardly curved shape, said top end wall having a substantially circular combined pressure relief and maintenance open portion therethrough, a circumferential seating flange about said open portion, and a pressure-sensitive relief cover assembly adapted to normally close-off said open portion; said cover assembly comprising: an operating stem having handle means at its upper end and a threaded end portion at its lower end, a domed cover member loosely positioned on said stem, spring and clamping means positioned on said stem and adapted to be tilted for insertion through said open portion and to then be turned to an upright position at which said clamping means extends across the maintenance opening for engagement with the underside of said seating flange, a nut carried on said threaded end portion and retained by said spring and clamping means in a non-rotatable position on said stem and with respect to said seating flange, said spring means being positioned between said nut and said clamping means, whereby manual turning of said handle means will rotate said stem with respect to said nut to, in one direction, apply increasing cover member closing force on said spring and clamping means, and to, in an opposite direction, relieve the application of closing force on and to loosely position said cover members with respect to said stem.

16. In an improved transformer construction as defined in claim 15, said fuse having a current cut-off rating of about twice the current rating of said transformer.

17. In an improved overhead transformer enclosure construction, a hollow cylindrical casing of metal construction having an outwardly convexly shaped integral enclosing bottom end wall and an outwardly convexly shaped upper end wall integrally secured thereon, said upper end wall having a substantially circular fluid pressure fluid relief and maintenance open portion therethrough and defined by an upwardly offset seating flange thereabout of angular shape, a pressure relief hand-hole cover member for said open portion of outwardly convex shape, said cover member having an angular-shaped sealing flange thereabout, a ring gasket operatively positioned for sealing engagement between said seating and said sealing flanges, an operating stem extending rotatably centrally through said cover member and having an outer handle portion and an inner threaded end portion, a corss-extending clamping member carried substantially centrally on said stem and adapted to extend therefrom to latch-engage an under-portion of said seating flange, a retention bracket member having a nut secured thereon engaging the threaded end portion of said stem, Belleville washer means carried on said stem between said clamping and bracket members, said retention bracket member cooperating with said clamping member to prevent rotation of said nut on said stem, said handle portion being adapted to turn the threaded portion of said stem within said nut and advance said nut upwardly to compress said washer means against said clamping member and secure said cover member in a sealing-off position with respect to the open portion, whereby said cover member will be forced substantially uniformly upwardly to an open position when fluid pressure within said casing becomes greater than the force exerted by said washer means.

* * * * *